US008375092B2

(12) United States Patent
Digate et al.

(10) Patent No.: US 8,375,092 B2
(45) Date of Patent: Feb. 12, 2013

(54) SYSTEM AND METHOD FOR IMMEDIATE AND DELAYED REAL-TIME COMMUNICATION ACTIVITIES USING AVAILABILITY DATA FROM COMMUNICATION THROUGH AN EXTERNAL INSTANT MESSAGING SYSTEM

(75) Inventors: Charles J. Digate, Winchester, MA (US); Christopher F. Herot, Newton Highlands, MA (US); Tonytip Ketudat, Lexington, MA (US); Alexis M. Kopikis, Brighton, MA (US); Daniel J. Teven, Sharon, MA (US)

(73) Assignee: Devereux Research AB LLC, Wilmington, DE (US)

( * ) Notice: Subject to any disclaimer, the term of this patent is extended or adjusted under 35 U.S.C. 154(b) by 0 days.

(21) Appl. No.: 12/463,200

(22) Filed: May 8, 2009

(65) Prior Publication Data

US 2009/0216851 A1 Aug. 27, 2009

Related U.S. Application Data

(63) Continuation of application No. 10/367,640, filed on Feb. 14, 2003.

(51) Int. Cl.
*G06F 15/16* (2006.01)
(52) U.S. Cl. ......... 709/206; 709/207; 709/204; 709/219
(58) Field of Classification Search .................. 709/203, 709/223, 224, 227, 204, 205, 206
See application file for complete search history.

(56) References Cited

U.S. PATENT DOCUMENTS

| 5,283,856 | A | 2/1994 | Gross et al. | |
|---|---|---|---|---|
| 5,742,905 | A | 4/1998 | Pepe et al. | |
| 6,449,344 | B1 | 9/2002 | Goldfinger et al. | |
| 6,549,937 | B1 * | 4/2003 | Auerbach et al. | 709/206 |
| 6,678,719 | B1 | 1/2004 | Stimmel | |
| 6,691,162 | B1 | 2/2004 | Wick | |
| 6,714,965 | B2 * | 3/2004 | Kakuta et al. | 709/204 |

(Continued)

FOREIGN PATENT DOCUMENTS

| EP | 1545087 | 6/2005 |
|---|---|---|
| WO | 2004/074985 | 9/2004 |

(Continued)

OTHER PUBLICATIONS

Extended European Search Report dated Aug. 13, 2010 for International Application No. PCT/US2007/010532.

(Continued)

*Primary Examiner* — Barbara Burgess
(74) *Attorney, Agent, or Firm* — Brundidge & Stanger, P.C.

(57) ABSTRACT

A system and method for immediate and delayed real-time communication activities using availability data from and communications through an external instant messaging system, that operates to obtain aggregated user online presence information through its own client software, through interception of client-server communications between an external instant messaging client and server, and through other available interfaces to user account information on such external instant messaging systems. The system operates to gather user online presence information in part by intercepting communications between an instant messaging client and the Internet. The aggregate presence data, as well as other information describing the availability of a user, is used to intelligently route real-time communications, such as instant messages and phone calls. The disclosed system further implements a technique for waiting for changes in a user's availability status, and for performing actions on a user's behalf in response to such changes in availability status.

24 Claims, 9 Drawing Sheets

U.S. PATENT DOCUMENTS

| | | | |
|---|---|---|---|
| 6,721,410 B1 * | 4/2004 | Will | 379/202.01 |
| 6,772,229 B1 | 8/2004 | Achacoso et al. | |
| 6,912,564 B1 | 6/2005 | Appelman et al. | |
| 6,915,336 B1 * | 7/2005 | Hankejh et al. | 709/219 |
| 7,184,524 B2 | 2/2007 | Digate et al. | |
| 7,263,545 B2 * | 8/2007 | Digate et al. | 709/206 |
| 7,289,623 B2 * | 10/2007 | Lurie | 379/221.02 |
| 2001/0032244 A1 * | 10/2001 | Neustel | 709/206 |
| 2002/0023134 A1 * | 2/2002 | Roskowski et al. | 709/206 |
| 2002/0071539 A1 | 6/2002 | Diament et al. | |
| 2002/0078153 A1 | 6/2002 | Chung et al. | |
| 2002/0083127 A1 * | 6/2002 | Agrawal | 709/203 |
| 2002/0165000 A1 * | 11/2002 | Fok | 455/466 |
| 2003/0014488 A1 * | 1/2003 | Dalal et al. | 709/204 |
| 2003/0058844 A1 * | 3/2003 | Sojka et al. | 370/352 |
| 2003/0083079 A1 | 5/2003 | Clark et al. | |
| 2003/0093474 A1 * | 5/2003 | Kakuta et al. | 709/204 |
| 2003/0105820 A1 | 6/2003 | Haims et al. | |
| 2003/0110228 A1 * | 6/2003 | Xu et al. | 709/207 |
| 2003/0191676 A1 | 10/2003 | Templeton | |
| 2003/0229670 A1 * | 12/2003 | Beyda | 709/206 |
| 2003/0231647 A1 | 12/2003 | Petrovykh | |
| 2004/0015610 A1 | 1/2004 | Treadwell | |
| 2004/0039779 A1 * | 2/2004 | Amstrong et al. | 709/204 |
| 2004/0161080 A1 | 8/2004 | Digate et al. | |
| 2004/0162878 A1 | 8/2004 | Lewis et al. | |
| 2005/0044159 A1 | 2/2005 | Niemi et al. | |

FOREIGN PATENT DOCUMENTS

| | | |
|---|---|---|
| WO | WO2006060744 | 6/2006 |

OTHER PUBLICATIONS

Office Action dated Aug. 4, 2010 for U.S. Appl. No. 10/367,640.
Final Office Action dated Jan. 13, 2011 for U.S. Appl. No. 10/367,640.
Restriction Requirement dated Sep. 29, 2010 for U.S. Appl. No. 11/293,035.
Final Office Action dated Sep. 8, 2010 for U.S. Appl. No. 11/406,064.
Office Action dated Feb. 25, 2011 for U.S. Appl. No. 12/584,028.
Notice of Allowance dated Sep. 15, 2011 for U.S. Appl. No. 10/367,640.
Final Office Action dated Sep. 16, 2011 for U.S. Appl. No. 12/584,028.

* cited by examiner

| When (Events) 172 | If (Conditions) 174 | Then (Actions) 176 |
|---|---|---|
| Presence Changes<br>  user goes Online/Offline<br>  Explicit:<br>    Direct manipulation<br>    User Defined<br>  Implicit:<br>    In a meeting<br>    on the phone<br>    In-meeting events (e.g. presenting)<br>Time Passes<br>  Specific<br>  Recurring<br>  Elapsed Time<br>  Inaction<br>Invitation received<br>  To meet<br>  to join group/team<br>System Condition occurs<br>Trigger from 3rd party application | Presence<br>  Auto-detected<br>  User Defined<br>Device Availability<br>  Camera<br>  Video<br>  PC<br>  Phone<br>  SMS<br>  PDA<br>Bandwidth Capacity<br>Contact preference<br>Identity<br>  PID<br>  Lifeline<br>  -membership<br>  location<br>Group Membership<br>  General<br>  selection by role/<br>    rule | Notify (IM, E-mail,SMS)<br><br>Meet<br><br>Schedule<br><br>Call<br><br>Route<br><br>Broadcast<br><br>Contact Delegate<br><br>Leave Message<br><br>Transfer Thread<br><br>Retract |

*Fig. 9*

SYSTEM AND METHOD FOR IMMEDIATE AND DELAYED REAL-TIME COMMUNICATION ACTIVITIES USING AVAILABILITY DATA FROM COMMUNICATION THROUGH AN EXTERNAL INSTANT MESSAGING SYSTEM

The present invention is a continuation application of U.S. patent application Ser. No. 10/367,640 filed in the United States Patent Office on Feb. 14, 2003, the entire contents of which is incorporated herein by reference.

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

The present invention relates generally to real-time communication activities, and, more specifically, to a system and method for providing immediate and delayed real-time communication activities based on user availability, as determined from and/or in cooperation with one or more external instant messaging systems.

As it is generally known, and despite all previous attempts to fully automate business processes, there remains a large class of problems that require human expertise and action, often through some form of real-time interaction. Since relevant information to solve a given problem is often stored in the minds of specific individuals, successful problem solving often entails identifying that person whose expertise enables them to deal with the problem, and initiating contact with that person via a real-time communication technique, such as through instant messaging software, the telephone system, and/or online or face-to-face meetings. This process may require effectively choosing among multiple people and multiple means of contacting those people. For a programmed computer system to assist in this process, it must have some way of assessing whether a given person is currently reachable by one of a number of appropriate communication channels, and whether the person is currently available for the desired action.

In existing instant messaging systems, one increasingly important mechanism for assessing a person's current, online presence is the state of that person's instant messaging account. Public instant messaging services such as AOL®, MSN®, and Yahoo® are known to maintain information on their users, such as whether they are currently logged in, and whether they have been typing at their keyboard recently. Such existing systems further allow a user to explicitly set presence states to indicate that they are away from the computer or do not wish to be disturbed.

While industry groups are working to establish standards for interoperability among instant messaging systems, existing public systems currently do not support such a standard. Accordingly, it may be difficult to obtain presence information through existing instant messaging systems. This problem is exacerbated by the fact that some existing systems present different information to different users (e.g. one user may specify that his or her online presence is only to be shared with specified users).

Existing systems have further shortcomings in the area of real-time communications. These shortcomings include the lack of a simple, data-driven mechanism for users to effectively specify how a desired real-time communication should be provided. Existing systems fail to provide a mechanism by which a user can conveniently and comprehensively define contact information, as well as delegated stand-ins for that user, where such stand-ins may be considered as alternative contacts, or automatically contacted in the event that the user is determined to be currently unavailable. Additionally, existing systems do not provide a mechanism for organizations to configure a real-time communication system to meet more sophisticated, business specific requirements.

Accordingly, it would be desirable to have a system that provides a simple, data-driven mechanism for users to control how various real-time communication operations are provided, such as by indicating or providing contact information and names of delegated stand-ins through a graphical user interface. Such a system should also provide a mechanism for organizations to define complex rules that fit their specific business processes.

Additionally, it would be desirable to have a system that includes support for communication requests that span extended time periods. For example, the system should support an operation in which a sender issues a request that a real-time communication take place when a chosen recipient becomes available, and in which the system waits for the availability of the recipient for hours, days, or weeks. Moreover, the system should be able to efficiently support this service for large numbers of users, by efficiently providing a way for information about real-time communication requests to be stored and retrieved, and also avoid the use of a separate process running in a server system for each such request.

BRIEF SUMMARY OF THE INVENTION

In accordance with the present invention, there is disclosed a system and method for supporting immediate and delayed real-time communication activities using availability data from and communications through an external instant messaging system. The disclosed system operates to obtain aggregated user online presence information through its own client software, through interception of client-server communications between an external instant messaging client and server, and through other available interfaces to user account information on such external instant messaging systems. As described herein, availability data or status of a user reflects what is generally referred to as the online presence of that user.

In one embodiment, the disclosed system operates to gathering user online presence information in part by intercepting communications between an instant messaging client and the Internet. The disclosed system then operates using the aggregate presence data, as well as other information describing the availability of a user, to intelligently route real-time communications, such as instant messages and phone calls. The disclosed system further implements a technique for waiting for changes in a user's availability status, and for performing actions on a user's behalf in response to such changes in availability status.

Thus there is disclosed herein a system and method that provides a simple, data-driven mechanism for users to specify how various real-time communication operations are provided. The disclosed system enables users to indicate or provide contact information and names of delegated stand-ins through a graphical user interface, and provides a mechanism for organizations to define complex rules that fit their specific business processes. The disclosed system further supports requests for communication operations that are not immediately deliverable, due to the unavailability of certain participant users. Such requests may span multiple days. For example, the disclosed system supports operations in which a sender issues a request that a telephone conversation take place when a chosen recipient becomes available, and in which the system waits for the availability of the recipient for hours, days, or weeks. Moreover, the disclosed system efficiently supports this service for large numbers of users, by efficiently providing a way for the information about real-time communication requests to be stored and retrieved, without the use of a separate process running in a server system for each such request.

While the disclosed system is described herein with reference to various embodiments and examples of operation in which convening a meeting is used as an example of a real-time activity or action, the real-time activities or actions provided by or in connection with the disclosed system are not limited to meetings between users, and may additionally or alternatively include chat sessions, shared whiteboards, remote presentations, audio conferences, video conferences, and/or any combination of these or other forms of communication between users.

Other features, aspects and advantages of the presently disclosed system and method will be apparent from the detailed description of the invention that follows.

BRIEF DESCRIPTION OF THE SEVERAL VIEWS OF THE DRAWING

The invention will be more fully understood by reference to the following detailed description of the invention in conjunction with the drawings, of which:

FIG. 9 is a table showing relationships between events, conditions and actions, as used in rules in an illustrative embodiment.

DETAILED DESCRIPTION OF THE INVENTION

Figure 1:
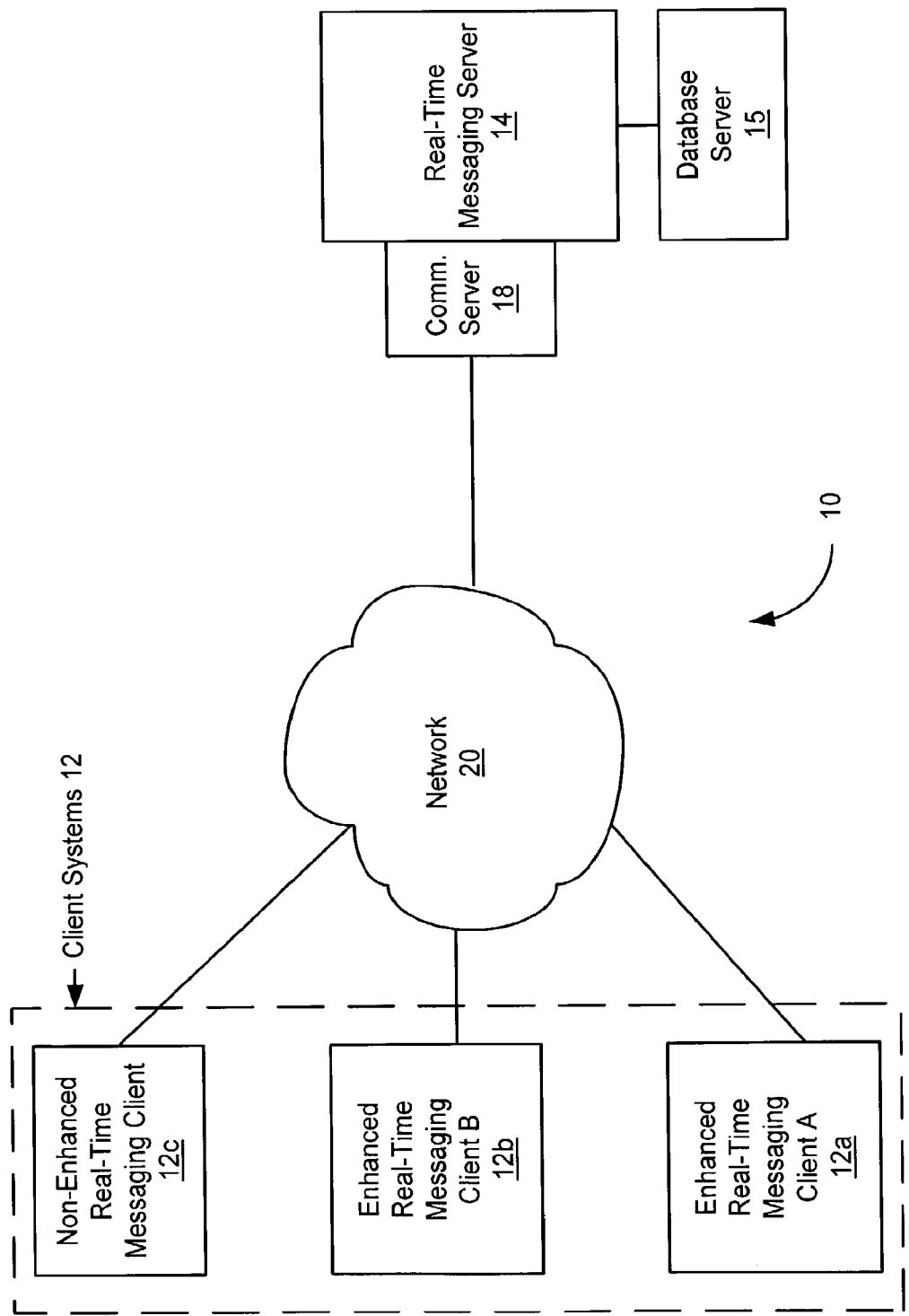
FIG. 1 is a block diagram illustrating an embodiment of the disclosed system in which a number of real-time messaging client systems are interconnected with a real-time messaging server via a network.

As shown in FIG. 1, an embodiment of the disclosed system includes a number of real-time messaging client systems 12, shown for purposes of illustration as enhanced real-time messaging clients 12a and 12b, as well as non-enhanced real-time messaging client 12c. The real-time messaging client systems 12 are communicably coupled with a network 20, to which a communication server 18 is also communicably coupled. The communication server 18 may, for example, be embodied as a Macromedia® Flash™ Communication Server MX. A real-time messaging server 14 is shown communicably coupled to the communication server 18, and a database server 15 is further shown communicably coupled to the real-time messaging server 14.

Each of the server systems 14, 15 and 18, as well as the client systems 12a, 12b and 12c, may be embodied as separate computer systems, each including one or more processors, together with program code memory and one or more secondary program code storage devices, a number of input/output interface devices, and operating system and application program software, as configured for a given operational environment. The communication server 18 includes Web server software including an HTTP (HyperText Transport Protocol) server that manages Web page requests received over the network 20, and that delivers HTML (HyperText Mark-up Language) documents (Web pages) in response. A separate server system including Web server software, coupled to the communication server 18, may alternatively be used for this purpose. The enhanced client systems A 12a and B 12b include client software operable to perform functions associated with the disclosed system in cooperation with the real-time messaging server 14. The non-enhanced client system 12c does not include specialized client software associated with the real-time messaging server 14. Instead, messages and content used to take advantage of features of the disclosed system may be loaded and processed as needed by other software on the non-enhanced client system 12c. The embodiment of the disclosed system shown in FIG. 1 operates to provide real-time messaging and other functions to users of client systems having client software associated with the real-time messaging server 14 loaded on them, as well as to users of client systems that do not have such client software loaded on them but do have some mechanism allowing software to be loaded on demand, such as Flash or Java.

While in the illustrative embodiment of FIG. 1, the real-time messaging server 14, communication server 18 and database server 15 are shown as separate computer systems, the present invention is not limited to such an embodiment. In alternative embodiments, the communication server 18, real-time messaging server 14 and database server 15 may be embodied within some greater or lesser number of separate computer systems, as needed for a given operational environment.

The communication server 18 in the embodiment of FIG. 1 is shown only for purposes of explanation, and the present invention is not limited to implementations or embodiments including it. The present system may be embodied using any specific type of previously installed client side application software, such as Flash™, that is capable of providing text, video, and/or other content in an interactive graphics format through Web pages downloaded to a Web browser program executing on a client system. The embodiment of FIG. 1 illustrates that the disclosed system may be implemented in a way that takes advantage of such previously loaded client system interface software. The use of previously installed client side software, such as the Flash™ client side software, enables the disclosed system to operate without requiring the loading of special client side software, leveraging the common availability of software such as Flash™ software on most client computer systems. Thus, the communication server 18 generally defines a protocol to interface to non-enhanced client systems. An example of such a protocol is RTMP ("Real Time Messaging Protocol"). In the alternative, the disclosed system may be embodied using only enhanced real-time messaging client systems, such as client A 12a and client B 12*b*, which have been loaded with specialized client software. In any case, the real-time messaging server 14 may directly communicate with such enhanced client systems, without using an intermediate server such as the communications server 18.

During operation of the disclosed system, as shown in the embodiment of FIG. 1, real-time messaging is provided between users of the client systems 12, based on rules and a rules engine in the real-time messaging server 14, and in response to a number of monitored conditions, such as the availability status of users, as well as the detection of predetermined events. The real-time messaging provided by the disclosed system advantageously facilitates rapid initiation of real time group actions, such as meeting convocation, by contacting a group of users required for a meeting based on dynamically determined group membership, at least in part as a function of which users are presently available to participate. The disclosed system allows stand-ins to be substituted for group members that are unavailable. Stand-ins may be automatically selected for group members based on matches between their roles, expertise and/or preferences with respect to the requirements of a specific meeting, as well as on stand-in designations made by individual users, as represented by data stored on the real-time messaging server. For example, the disclosed system may provide selective delegation as a function of the subject matter of a given meeting. Additionally, the disclosed system provides transitivity of delegation to stand-ins between users or groups, resulting in an increased ability to quickly get a given inquiry to an appropriate user.

The disclosed system provides a number of features relating to the use of groups. First, the disclosed system permits group definitions to be shared among users. Also, temporary membership in a group may be enabled, for example to grant temporary access to data and/or specific functions associated with the group. Further, with regard to determining an appropriate stand-in, the disclosed system may operate to provide data mining for relevant skills assessment, e.g. by identifying one or more user(s) who recently published something on a given topic, or that responded to a message on the topic.

Figure 2:
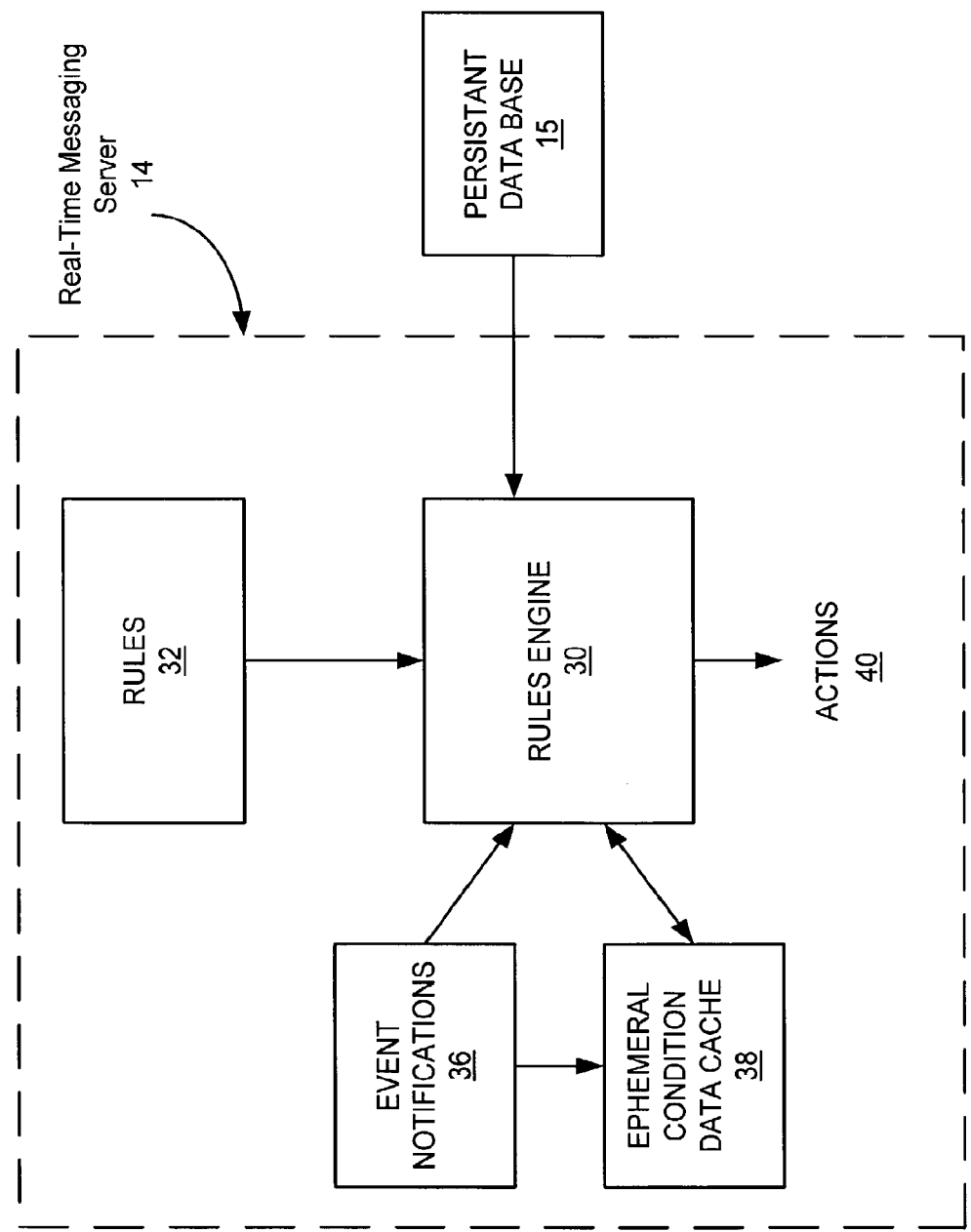
FIG. 2 is a block diagram illustrating an embodiment of the disclosed real-time messaging server.

FIG. 2 shows an example of software components within the real-time messaging server 14 of FIG. 1. As shown in FIG. 2, the software components within the real-time messaging server 14 include a rules engine 30 for processing a number of rules 32. The rules engine 30 is responsive to event notifications 36 and the contents of the ephemeral condition data cache 38. The rules engine 30 is further responsive to the contents of a persistent database 15, which may, for example, be stored on a separate database server system, such as the database server system. Alternatively, the rules 32 may not be separate from the rules engine itself, but be provided within the rules engine itself.

The ephemeral condition data cache 38 includes presence indications for users. Such presence indications reflect the instantaneous availability of system users. Such instantaneous availability information may, for example, be obtained through a subscription model, in which the software on the real-time messaging server subscribes to notifications from specific client systems indicating events relating to the online status of certain users. Such notifications might include event messages indicating when a user logs on or off a client system. Accordingly, the ephemeral condition data cache 38 is used to store information describing previous events. Additionally, users that are registered with the disclosed system, referred to as "subscribing users", may store information, for example in the persistent database 15, that control how their presence information is provided as availability status to other users. For example, an availability filter may be configured by a user such that the online presence of that user is made known to all users, to some other users, or to no other users. Such availability filtering may be based on the definition of a VIP ("Very Important Person") list for a user. The user entries in a VIP list store information defining how the availability of that user is made available or visible to other users. Such selective availability may be defined on a user-by-user basis, and/or on a group or global basis, and may further be defined to reflect current conditions or other factors, such as time of day, specific dates, or functional associations. Accordingly, a user may configure his or her VIP list to allow a group of other users to be aware of his or her availability only at certain times of day, and/or on certain days. Additionally, a user may specify how availability is filtered based on activities, topics, or functions. For example, a user may configure his or her account such that a group of other users can only see that user as available only for meetings regarding certain predefined topics.

The persistent database 15 includes configuration data maintained by the disclosed system reflecting user preferences and group definitions. In an embodiment in which users that are "subscribers" may define account information, the database 15 maintains account data for such subscriber users. Subscriber data may include, for example, stand-in definitions, availability filters, and/or contact lists of other subscriber users as well as non-subscriber users. The rules 32 define the actions 40 that are performed in response to the event notifications 36, ephemeral condition data cache 38, and data stored in the persistent database. The rules 32 are processed by the rules engine 30, which may be embodied in any appropriate programming language for a given implementation.

The actions 40 performed by the rules engine 30 may, for example, include actions facilitating any specific kind of real time group activity. Such real time group activities may include the convening of an online meeting or teleconference, sending email or an instant message to one or more users, routing a document, and/or other actions. The actions 40 may be simple or complex, and potentially include multi-stage actions that are performed in several distinct steps, depending on the receipt of several separate event notifications and the state of conditions stored in the ephemeral condition data cache over time.

Figure 3:
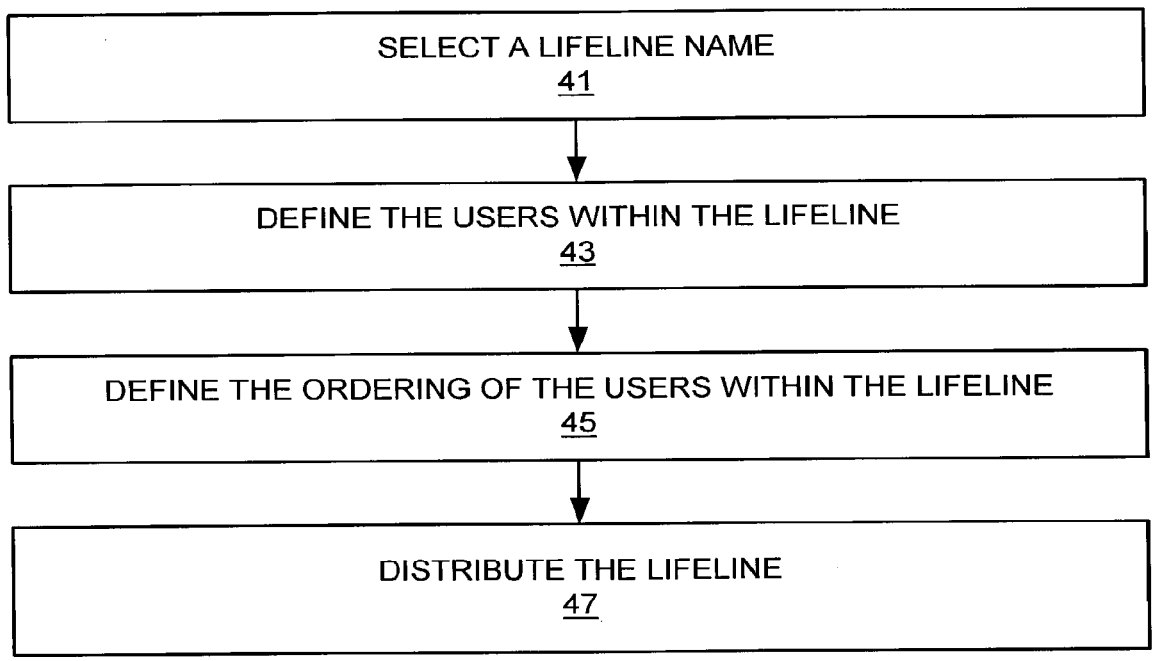
FIG. 3 is a flow chart showing steps performed to create a lifeline in an illustrative embodiment.

FIG. 3 is a flow chart illustrating the steps performed by the user of the disclosed system to configure a "lifeline." A lifeline in the disclosed system is a list of users that is associated with a name, and one or more ordering attributes. At step 41, the user selects the name of the lifeline being created. For example, a lifeline consisting of a list of users in technical sales support group for a given product might be referred to as the "product_A_tech" lifeline. At step 43, the users within the lifeline are defined, for example by entry or selection through a graphical user interface. At step 45, a number of ordering attributes may be defined, that are used to control the selection of individual ones of the users within the lifeline for specific requests for activities or tasks. Such ordering attributes may indicate that users within the lifeline are to be selected randomly over sequentially received requests, or on a round robin basis. Alternatively, a specific ordering may be defined within the list, setting forth a specific order of selection to be applied to the users within the lifeline for requests processed over time, and potentially in response to the availability of users within the lifeline. The ordering defined at step 45 may be defined so that the users in the lifeline are displayed to users issuing requests designating the lifeline in a request, thus enabling a requesting user to specify the desired lifeline member for a given request. At step 47, the lifeline is distributed to some set of users, who may add the lifeline to their contact list. For example, the "product_A_tech" lifeline mentioned above might be distributed to members of the sales force responsible for selling product A. When such a sales person subsequently has a need to contact a technical support person, they can then generate a request indicating the "product_A_tech" lifeline without needing specific knowledge of the individual users within the lifeline.

Figure 4:
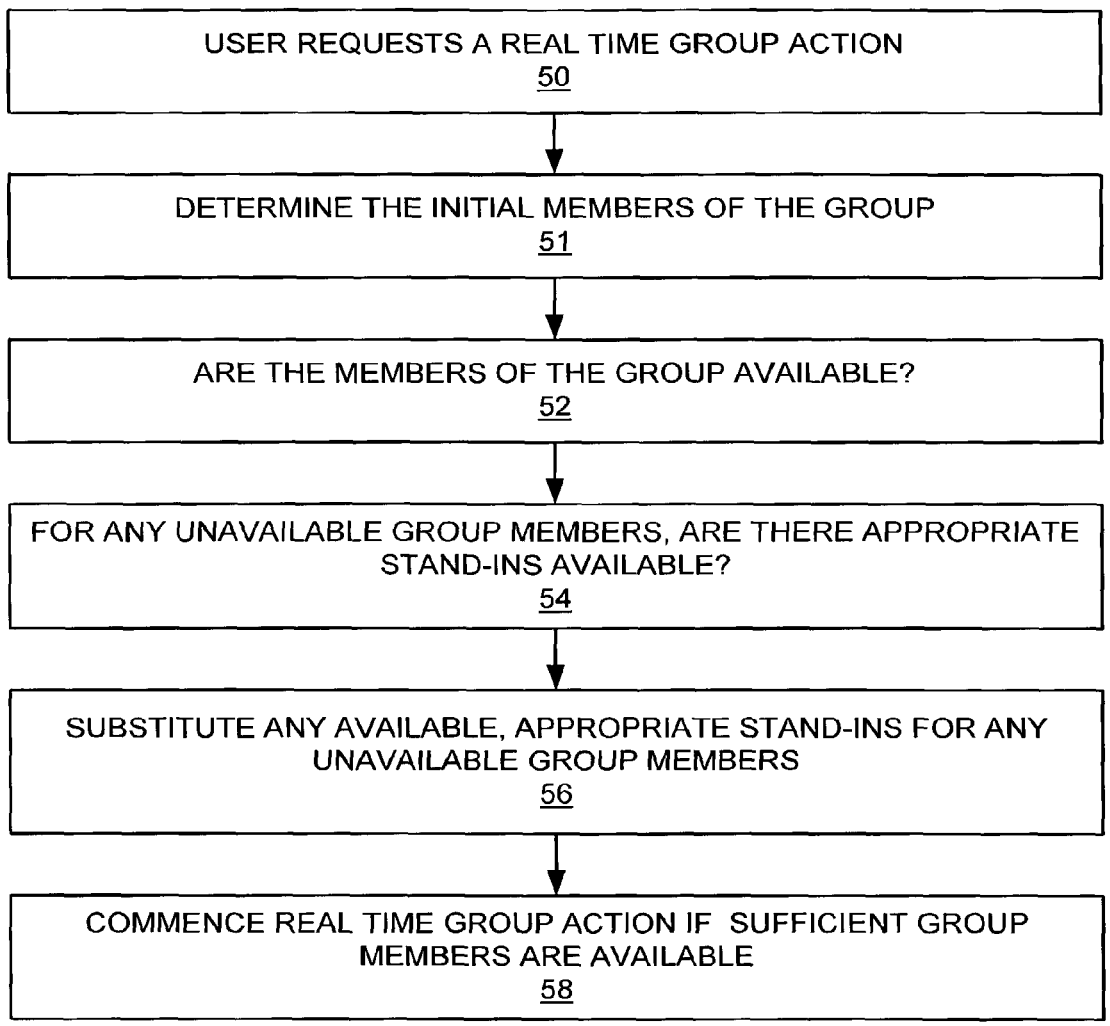
FIG. 4 is a flow chart showing steps performed during operation of an illustrative embodiment to process requests for real time group actions.

FIG. 4 is a flow chart showing steps performed by an illustrative embodiment of the disclosed system to initiate a real time group action. At step 50, a user generates a request for a real time group action, for example through a graphical user interface on a client system. An example of a request for a real time group activity is a request to convene a meeting. The calling of a meeting may involve entering a list of participants in the action, for example meeting invitees. The list of action participants specified by the user calling the meeting form what is referred to herein for purposes of explanation as the "participant group" for the action. Moreover, the user requesting the group action may indicate a number of attributes associated with the request, and/or one or more users specified in the participant group. For example, the user calling a meeting may indicate a meeting topic, location, time and/or priority. The attributes associated with members of the participant group may include a function or role associated with one or more of the meeting group members, as well as whether a meeting group member is necessary for the meeting to be held or optional. For example, a participant group member might be associated with a function such as "finance", or "technical", indicating a role that that user will be expected to fulfill in the meeting.

Additionally, the disclosed system may allow for the members of the meeting group to be defined by designation of a predetermined group or lifeline. Such a predetermined group or lifeline definition may be configured by the user, or made available to specific users, or to all users on a system-wide basis. For example, in a deployment of the disclosed system by a given company, a predefined group might be defined to include the members of a senior management team for the company. Moreover, an individual user within the company may set up or configure his or her own account to include one or more named groups of users that are relevant to that user's day to day activities, such as a "project team" group including all members of that user's current project team.

At step 51, the disclosed system determines the initial members of the participant group. In the case where the request defined at step 50 includes designation of a lifeline, at step 51 the disclosed system applies the selection attribute(s) associated with the lifeline to the lifeline, and determines which specific member of lifeline is to be considered one of the members of the participant group for the request. The determination of which member of the lifeline is to be added to the participant list is potentially further responsive to current availability status of the lifeline members, depending on presence information, attributes of the request, and/or user defined availability filters.

At step 52, the disclosed system determines whether each individual within the participant group is available. The availability of each participant group member may be determined based on user defined availability filtering, and depend on the attributes associated with the request, such as who called a meeting, a meeting topic, and/or whether a participant group member is defined as a necessary attendee for a meeting. The availability of each participant group member is further determined in response to the online presence of each meeting group member, as stored in the real time messaging server.

At step 54, for any participant group members that were determined to be unavailable, the disclosed system operates to determine whether there are any acceptable stand-ins available. For example, if a given participant group member has defined a stand-in to be provided for any meeting called when that meeting group member is unavailable, and that participant group member is in fact unavailable, then the system determines whether the stand-in is currently available. Again, the availability of any stand-in may be determined using the stand-in's availability filter, and depend both on the stand-in's online presence, and/or attributes associated with the request generated at step 50. In some cases, the disclosed system may act to automatically determine alternative participant group members or stand-ins. Alternatively, the requesting user may be given the option of approving any stand-ins before they are substituted into the participant group for the requested action. Additionally, the requesting user may be given the option to designate participant group members as being non-essential to allow a meeting to convene if there is no acceptable stand-in available.

At step 56, the disclosed system substitutes any available, appropriate stand-ins into the participant group. The appropriateness of any potential stand-in identified by the system may be determined by presenting the potential stand-in to the original user that initiated the request. For example, if the caller of the meeting finds the proposed stand-in acceptable, the caller may indicate the appropriateness of the stand-in to the system through the user interface. At step 56 the real time group action is commenced if there are sufficient participant group members available. For example, in the case of a request for a meeting, if there are sufficient members of the requested meeting group available, and all the necessary members of the meeting group are available, including any stand-ins determined at step 56, the disclosed system operates to convene the requested meeting at step 58.

Figure 5:
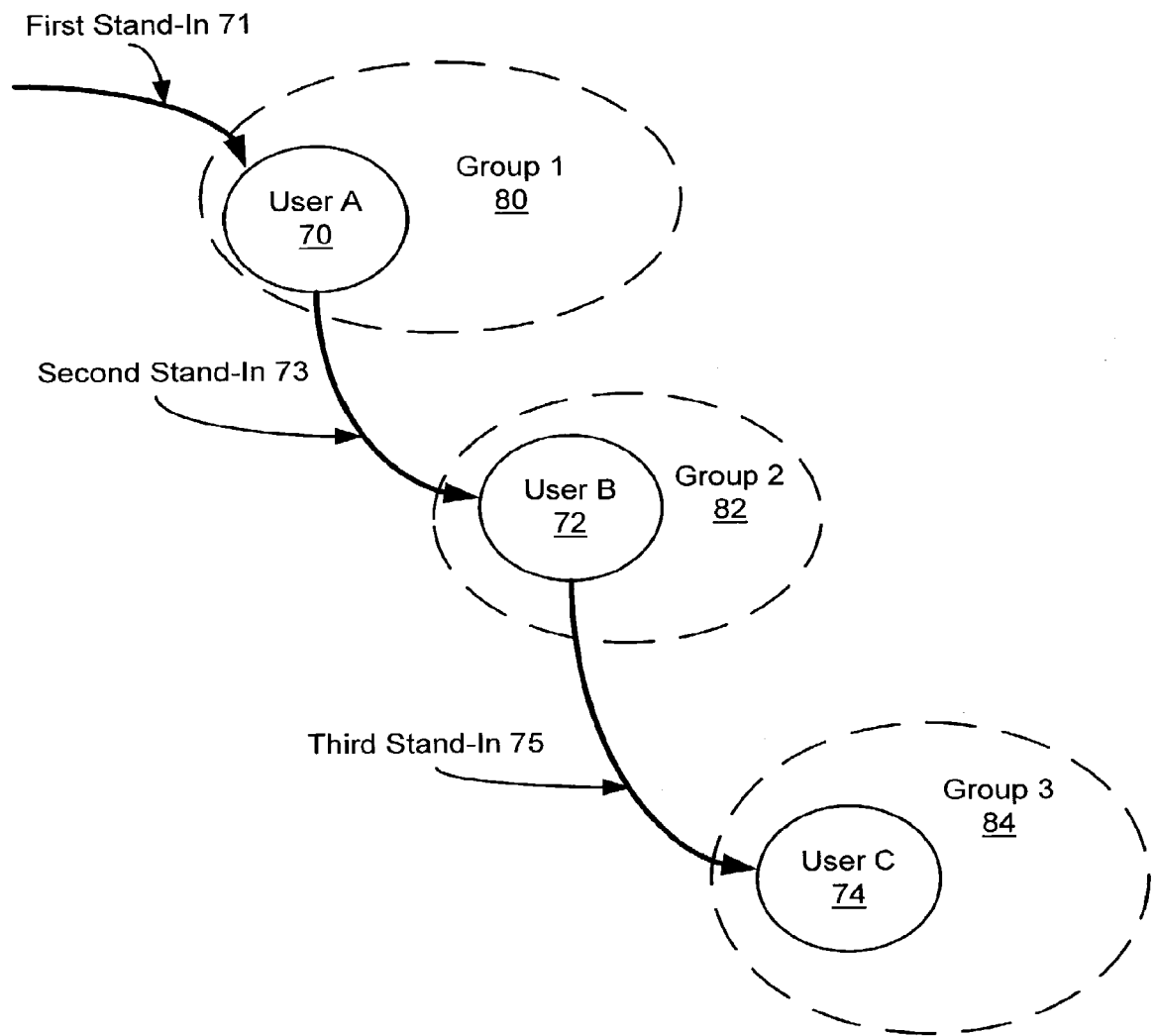
FIG. 5 illustrates transitivity of delegation in the disclosed system.

FIG. 5 illustrates the transitivity of delegation to stand-ins across multiple user groups in an embodiment of the disclosed system. As shown in FIG. 4, the disclosed system operates to determine a first stand-in 71 by selecting user A 70 from Group 1 80. For example, the first stand-in 71 is selected when a first meeting invitee is determined to be unavailable. The unavailable invitee had previously defined a stand-in either by designating user A 70, or by designating Group 1 80. For example, in the case where the expertise associated with an requested participant for a requested meeting is finance, a user A 70 may automatically be selected as a stand-in from Group 1 80, based on the fact that user A 70 serves the finance function within Group 1 80. However, if at the time the meeting was called, user A 70 is also not available, and assuming that either user B 72 or Group 2 82 is defined as a stand-in for either User A 70 or Group 1 80, the disclosed system then operates to find identify user B 72 as a stand-in for user A 70. For example, if User B 72 is defined as a finance expert within Group 2 82, User B 72 may automatically be selected as a stand-in for the meeting by the second delegation 73. As shown in FIG. 4, if User B 72 is also unavailable for the meeting, and either user C 74 or Group 3 84 has been designated as the stand-in for either User B 72 and/or Group 2 82, user C 74 is selected to join the meeting group by the third stand-in operation 75, for example resulting from the definition of user C 74 as the finance function user within Group 3 84.

Figure 6:
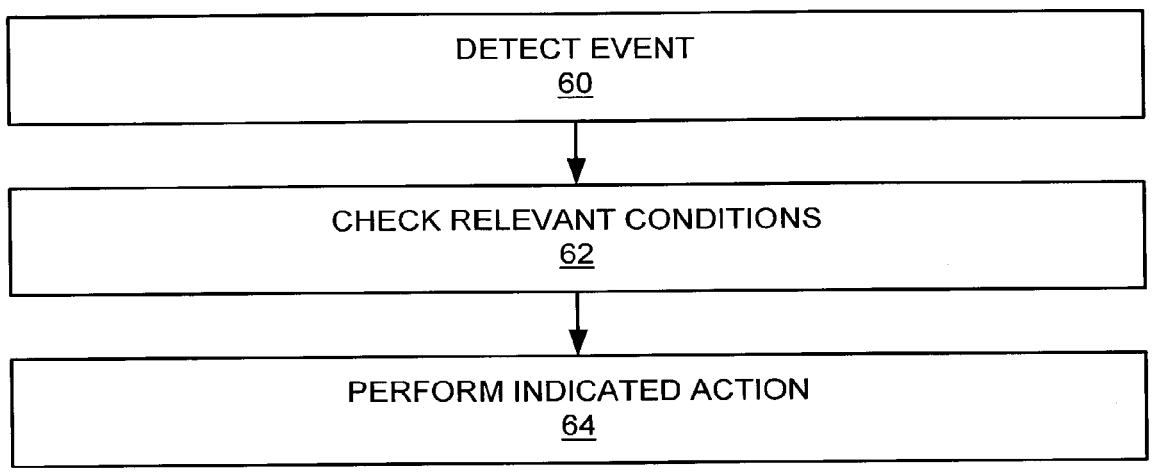
FIG. 6 is a flow chart illustrating steps performed during operation of an illustrative embodiment of the disclosed rules engine.

FIG. 6 illustrates steps performed during operation of the rules engine 30 as shown in illustrative embodiment of FIG. 1. At step 60, the rules engine 30 detects an event notification 36, such as a presence related notification. Such a presence related notification may indicate whether a specific user has either gone on or off line. After step 60, at step 62, the rules engine checks the relevant data in the ephemeral condition cache 38. The checking performed at step 62 may, for example, be performed by a script that was previously generated by the rules engine 30 in response to a previous event notification. Accordingly, the checking performed at step 62 may be different from the checking originally performed in connection with a given request that could not be accommodated. At step 64, the disclosed system performs an action based on the determinations at step 62 and the event detected at step 60.

Figure 7:
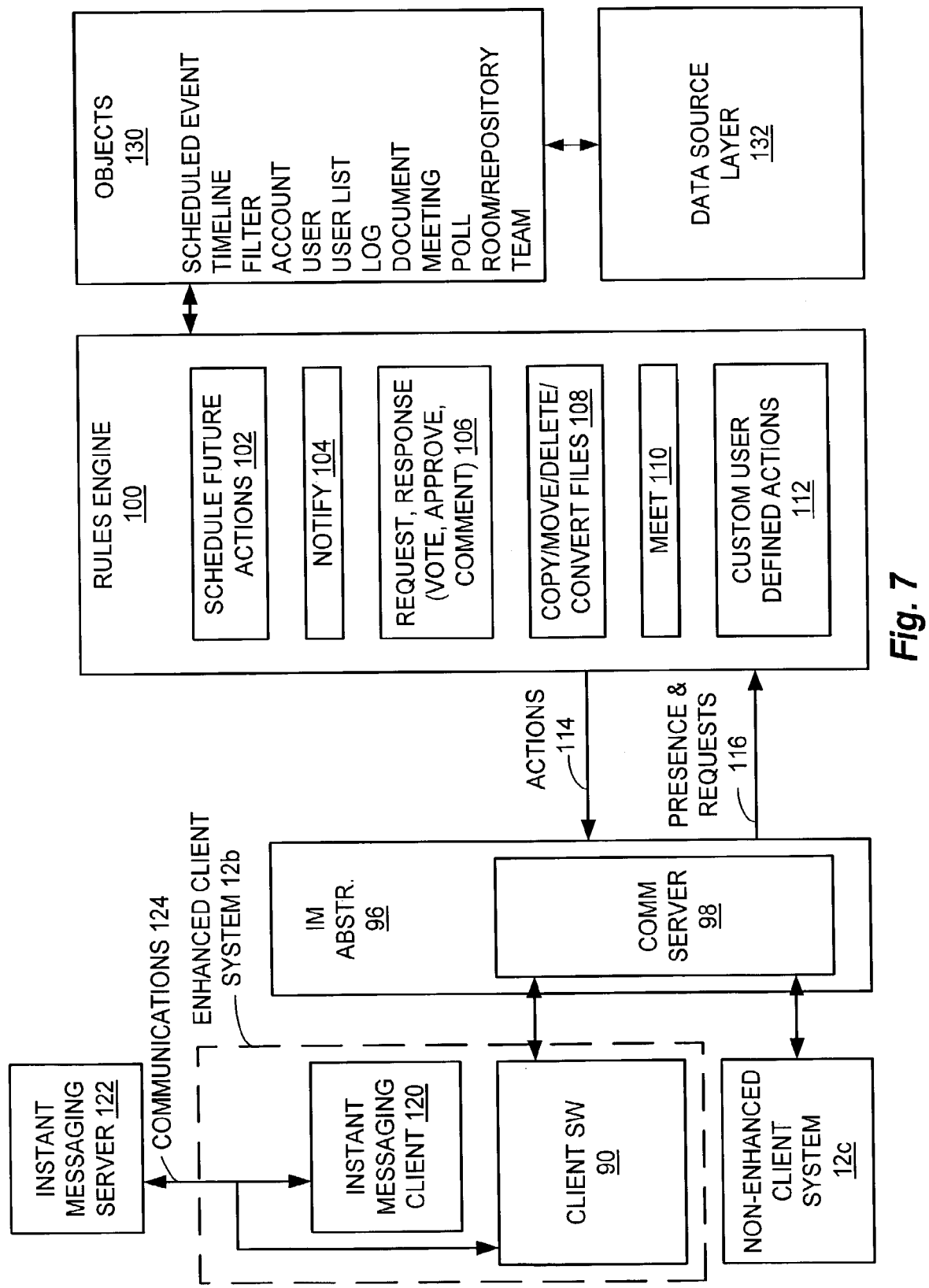
FIG. 7 is a block diagram showing structure and operation of the disclosed system in an illustrative embodiment.

FIG. 7 shows an illustrative embodiment of the disclosed system including a rules engine 100. The illustrative rules engine 100 is shown having several examples of functional units, each of which performs a number of associated real time communication activities. As shown in FIG. 7, a schedule future actions unit 102 is provided for scheduling actions to be performed at later points in time, a notify unit 104 is provided for performing notification actions, and a request, response (vote approve, comment) unit 106 is provided for supporting certain types of request and response actions related to voting, approval and commenting. A copy/move/delete/convert files unit 108 is further provided to support file operations performed by the rules engine, a meet unit 110 is provided to support convening meetings, as well as a custom user defined actions unit 112. The specific functional units shown in the rules engine 100 of FIG. 7 are shown for purposes of illustration only, and any appropriate functional units may be included within the rules engine 100 for a given embodiment. The functional units within the rules engine 100 define the processing performed by the rules engine 100, and may reflect a specific set of rules loaded into the rules engine 100.

The rules engine 100 is shown interfacing to a data source layer 132 through a number of object definitions 130. The object definitions 130 provide a predetermined interface to data sources such as ephemeral data, events, and one or more persistent databases contained in the data source layer 132. In addition to a relational database provided with the system for storing its own information, the data source layer 132 may also include external sources of data such as a corporate directory.

The rules engine 100 further operates to receive and process presence information and requests 116 from the instant messaging (IM) abstraction 96. The presence information received from the IM abstraction reflects the online status of one or more users with respect to one or more client systems. The requests received from the IM abstraction consist of requests for real time group activities, such as requests to convene meetings and/or send messages between users. As a result of processing the presence information and requests 116 received from the IM abstraction 96, the rules engine 100 issues the actions 114 back through the IM abstraction 96. For example, actions may include any real time group action, such as the convening of an online meeting or teleconference, and/or the passing of messages between users.

The client abstraction 96 is shown including a communication server 98 for communicating with a non-enhanced client system 12c. An enhanced client system 12b, is further shown in FIG. 7. The enhanced client system 12b includes client software 90, as well as a third party instant messaging client 120. The third party instant messaging client 120 may be any instant messaging client software, such as, for example, AIM™ (AOL (AmericaOnline™) Instant Messenger), Yahoo® Chat, Microsoft® MSN Messenger, Microsoft® Windows Messenger, IBM® Lotus® Sametime®, and/or IBM® Lotus® Web Conferencing clients. The instant messaging client 120 communicates with an instant messaging server 122 over a network such as the Internet. During operation of the disclosed system, the client software 90 intercepts communications between the instant messaging client 120 and the associated instant messaging server 122 to determine the online presence status of one or more users of the instant messaging client 120.

Figure 8:
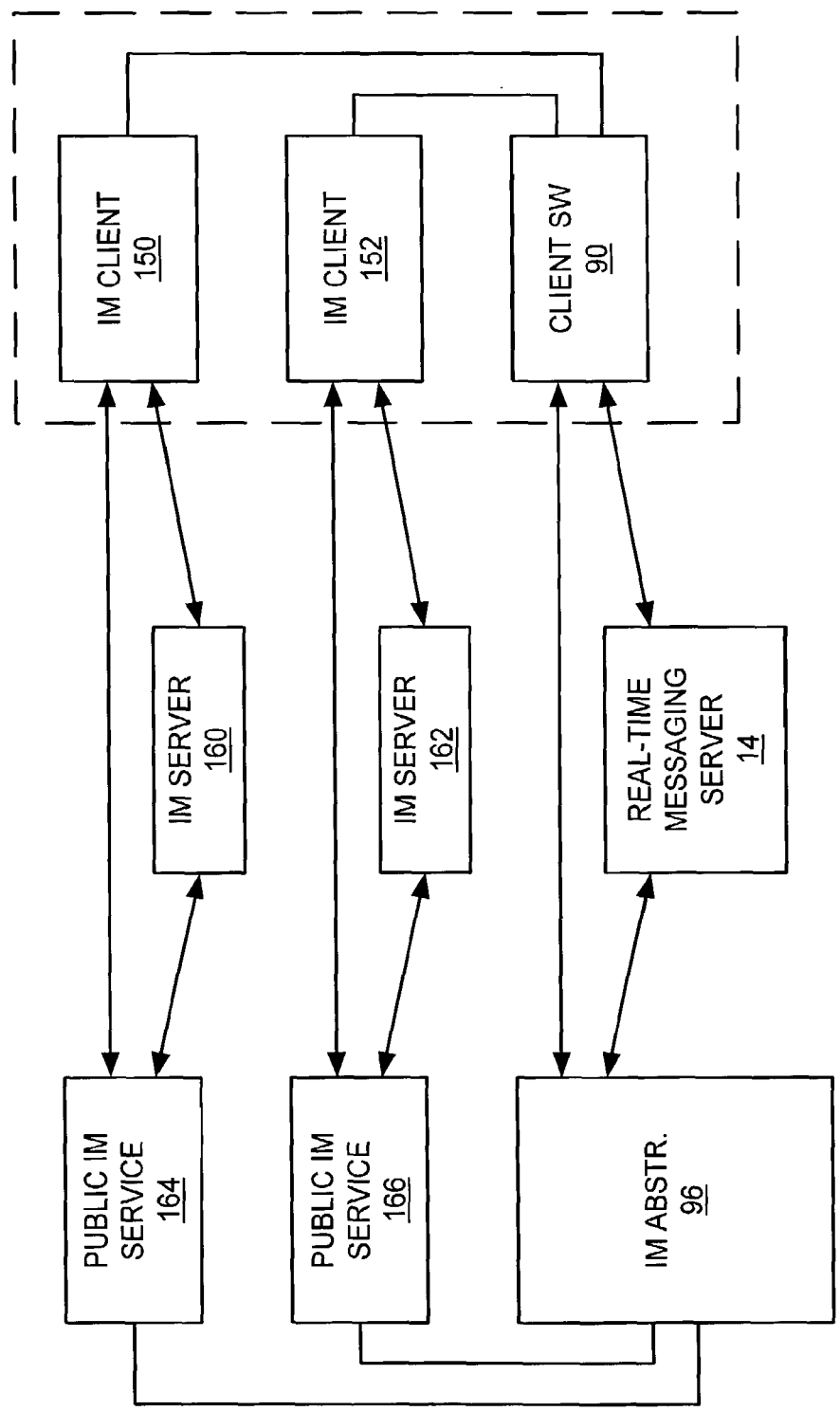
FIG. 8 is a block diagram illustrating the disclosed system interfacing with other instant messaging systems.

FIG. 8 illustrates how presence information flows to an embodiment of the disclosed system, which operates to determine user presence information from one or more separate instant messaging software systems. As shown in FIG. 8, instant messaging (IM) software clients 150 and 152 provide presence information regarding users both to respective instant messaging (IM) servers 160 and 162, as well as directly to respective public instant messaging (IM) services 164 and 166. The presence information provided from the IM clients 150 and 152 flows from the public IM services 164 and 166 to the IM abstraction 96, for example through predetermined interfaces between the IM abstraction 96 and the public IM services 164 and 166. Alternatively, as noted above, the client software 90 intercepts presence information sent to the IM client 150 and IM client 152 and, in turn, sends that information to the real-time messaging server 14, and directly to the IM abstraction 96. Additionally, user presence information is provided directly by the client software 90 to the real-time messaging server 14, and directly to the IM abstraction 96. The aggregated presence information collected through the IM abstraction 96 therefore reflects user presence as determined by each of the IM client 150, IM client 152, and client software 90. As noted above, the instant messaging client software 150 and 152 may be any instant messaging client software, such as, for example, AIM™ (AOL (AmericaOnline™) Instant Messenger), Yahoo® Chat, Microsoft® MSN Messenger, Microsoft® Windows Messenger, IBM® Lotus® Sametime®, and/or IBM® Lotus® Web Conferencing clients. These and various other instant messaging systems may be considered "external" instant messaging systems with regard to the disclosed system.

Thus, in the case where a user may be using or associated with client software of the disclosed system, and/or client software of one or more external instant messaging systems, presence information from one or more of those clients associated with or being used by that user may be aggregated prior to application of any user configured availability filtering. Moreover, presence information may reflect use of the disclosed system or external instant messaging client software through various communication mediums, including PDAs (Personal Digital Assistants) and/or telephones, as well as client software running on client computer systems.

In addition, the disclosed system may operate to use all facilities of such "external" instant messaging systems through which user presence or other information may be obtained. For example, the disclosed system may operate to send a meeting invitation to a user through an external instant messaging system. Such an invitation would include a pointer, such as a URL, to a resource such as a Web page on the real-time messaging server. When the receiving user clicks on the URL, they are able to begin participating in the real-time action, in this case an online meeting. The online meeting may be provided as content provided through the Web page indicated by the URL. Such invitations may be sent by the disclosed system to users, including users on non-enhanced client systems, as part of the process for convening an online meeting. In one embodiment, the invitation instant message is transmitted from an enhanced client system to a non-enhanced client system, by operation of the client software of the disclosed system introducing the instant message invitation into the communications between the external instant messaging client software, shown as instant messaging client 120 in FIG. 7, and the external instant messaging server, shown as instant messaging server 122 in FIG. 7. The user that is requesting the meeting may trigger the convening of the meeting at the enhanced client system, thereby causing the disclosed client software, shown as client software 90 in FIG. 7, to introduce the invitation instant message into the communications between the external instant messaging client and the external instant messaging server 122. In this way, users at non-enhanced clients may be invited to and participate in real-time actions through operation of the disclosed system.

FIG. 9 shows an example of the logical structure of rules that control the operation of the rules engine. As shown in FIG. 9, a number of illustrative events 172 and conditions 174 are used by the disclosed system to determine what appropriate actions 176 are to be taken. The specific relationships between events, conditions, and actions depend on the specific rules loaded into the disclosed system. The rules in the disclosed system may be pre-programmed as part of a software program, or may be user configurable. As shown in FIG. 9, the events 172 reflect the "when" logic of the rules, in that they trigger the testing of certain associated conditions. Similarly, the conditions 174 represent "if" logic, in that the state of a given condition determines whether a related action is performed. Finally, actions 176 are the "then" portion of the logic within the rules provided to the rules engine, in that they are performed as a result of the occurrence of an associated event as well as the potential testing of one or more associated conditions. The events that can be monitored may indicate presence changes with regard to one or more users, such as automatic detection of when a user goes on or off-line, or the explicit indication by a user that they are present through a user interface, or a user defined indication of availability. Additionally, presence related events may result from detection of user actions that imply whether the user is currently available, such as the user entering or leaving an on-line meeting, picking up or hanging up the phone, or beginning or ending certain activities within a meeting, such as a presentation. Events may also be time related, indicating the arrival of a specific time, a recurring time, an elapsed time, and/or user inaction. Invitations are another form of event, such as invitations to meetings, or to join a group or team. The events 172 may further include indication of a system condition, or consist of a trigger or message from some third party application software. Events may further include any type of user generated request or message passed to or through the disclosed system.

The conditions 174 may reflect the receipt of previous event notifications. For example, the conditions 174 may reflect automatically generated or user defined presence information, as well as the availability of various specific devices and/or resources that may be needed to perform an action. The conditions 174 may further reflect data stored in the disclosed system that indicates the contact preferences of a user, or the identity of a participant in a request, where that user might be designated by personal identifier, lifeline membership, location, and/or group membership. The actions 176 performed by the rules engine may include various types of communication activities, such as different types of notifications, including instant messages, e-mail and/or short message service (SMS) messages. The actions 176 performed by the disclosed system further may include convening of an online or other type of meeting, scheduling of a meeting in the future, initiating a call or conference call, routing a message between users, broadcasting a message to some or all users, contacting a stand-in for delegation purposes within a group or as part of a request, leaving a message for user, transferring a thread of control to user, and/or retracting some previously performed action.

Based on the user presence information gathered by the disclosed system, a request for real-time communications can be intelligently routed. For example, in the case where a user (referred to for purposes of explanation as the sender) needs to reach someone to ask a question, the disclosed system enables the convenient performance of the following three operations:

1. Identify a candidate recipient. This may entail looking up an expert on a topic, or a user that is assigned as the "programmer of the day", for example based on information stored in the database.

2. Select a method to contact that person, such as by sending an instant message to one or more accounts, sending a Short Message to their mobile telephone, or calling them on the telephone at the office or at home.

3. If the desired person is not available, selecting a person who the first identified recipient may have designated as a stand-in to receive communications when they are not available.

The steps above may need to be applied recursively, as part of trying alternative methods to reach a stand-in, such as calling the stand-in of a stand-in.

Those skilled in the art will recognize that the disclosed system may provide a simple, data-driven mechanism for users to specify how the above steps should be performed, such as by filling in a form in a graphical user interface with contact information and names of stand-ins. Moreover, the disclosed system provides a mechanism for organizations to define rules and operations that fit their own specific business processes.

Additionally, the disclosed system supports operations that span multiple days. For example, a sender may issue a request that a conversation take place when a specified recipient becomes available, in which the request indicates that the system should continue to wait for that recipient's availability for hours, days, or weeks. Since the system provides this service to a potentially large number of users, it provides an efficient way for the information about such requests to be stored and retrieved, since it is impractical to keep a process running in a server for each such request.

Example

Meet As Soon As Present (ASAP)

An example of a useful facility that may be provided by the disclosed system is a method of scheduling a meeting when all of the participants are available, referred to here as Meet ASAP. For example, in the case where a sender, A, wants to convene a meeting of three people, himself, B, and C. A selects B and C from his list of contacts and presses a Meet button within the graphical user interface. The system checks the presence of B and C and determines that B is online but C is not, and that a stand-in for C is available. It then gives A three choices:

1. Hold the meeting with just B.
2. Hold the meeting with B and with C's designated stand-in.
3. Wait until B and C are both present.

In the case where A chooses option 3, the system monitors the presence of A, B, and C and starts the meeting when all three are present. To support this choice, the disclosed system provides the following features in a highly scalable manner, and potentially over arbitrarily long periods of time:

1. Monitoring the presence of users on multiple instant messaging systems
2. Supporting rules for determining such things as when to hold meetings.

The disclosed system monitors user presence through multiple instant messaging systems-in two ways:
1. For instant messaging systems that provide open interfaces for exchanging presence (such as Lotus Sametime), the disclosed system retrieves presence through that interface. See FIG. 8.
2. For instant messaging systems that do not provide an open interface, the disclosed system intercepts presence information through the mechanism as follows (see FIG. 7):
Step 1. When client software for the disclosed system is installed on a sender's computer, it sets up a process, referred to for purposes of explanation as proc_1, that runs automatically when Microsoft Windows is started. Proc_1 registers with Windows to receive an event whenever a top-level window is created. If such a window belongs to an instant messaging system of interest, proc_1 then registers to be notified when any of those windows create new windows and it installs hooks to intercept input and output on network sockets. That socket i/o is directed to a second process, referred to for purposes of explanation as proc_2, which parses the data stream for messages describing the presence state of users being observed by the sender. That presence state is sent to the disclosed real-time messaging server which tracks it for use in step 2.
Step 2. When a sender requests a meeting, the client software for the disclosed system executes a set of rules to decide what to do. Such rules may be hard-coded in an appropriate programming language, such as C#, or alternatively users may be permitted to define their own rules. The rules behave as described above, looking through contact information, presence, and stand-ins to bring users together for a real-time action such as a meeting. The sender can control the operation of the system by modifying information stored by the system, e.g. selecting a new delegate or changing the contact information.
Step 3. Since a request can take days or weeks to process, the disclosed real-time messaging server stores information in a dictionary that resides in the relational database. When an event notification is received, such as a change in a user's presence or a pre-defined time for the expiration of a request, the disclosed real-time messaging server determines if there are any requests that depend on that event and retrieves the relevant information to process the event from the dictionary.

While various specific embodiments may be used, in one exemplary embodiment, two server-side processes may be used. One is the rules engine, which executes rules consisting of scripts. These rules/scripts are nearly stateless, but can use one or more associated dictionary data structures within the database containing the persistent state that a given script uses. Scripts may be stored in the database when they are inactive, along with their dictionary and meta-information about the script. A second server-side process that may be provided is a visibility server. The visibility server itself includes two elements: a raw presence server that keeps track of each user's actual online state, and a subscription service that keeps track of users that are paying attention to other users. The subscription service operates on the raw presence data and processes it to determine which users can see the presence information of which other users according to the rules processed by the rules engine. Accordingly, when a meeting request is received by the rules engine, and the meeting cannot be immediately held because of the unavailability of one or more participants, the rules engine creates a script to enable the convening of that meeting, and indicates to the visibility server that it is looking for all of the required participants for the meeting. The rules engine then goes to "sleep" with regard to that request. Whenever one of the attendees changes presence state, the visibility server sends a message to the engine, which checks whether all the required attendees are now present. If so, it executes the script, which sends a message to the user saying that the meeting may now be convened. If not, it just ignores the state change. Thus, the request from the rules engine to the visibility server consists of a script setting a bit of metadata, indicating to "wake me up when the following people are all present". This metadata persists along with the sleeping script in the database. As a result, if anything should happen to the visibility server (which resides mainly in memory), the desired subscriptions can be recreated from the metadata of the sleeping scripts in the database.

Example

Routing & Approval

The disclosed availability and rules-based mechanism that allows the effective delivery of real-time actions among users, such as the convening of meetings, can also be used for other real-time actions. For example, the disclosed aggregated presence information and availability filtering, together with real-time communication, can be used to route documents for revision and approval in a timely and efficient manner. As with a meeting request, a document routing form, for example filled out through a GUI on a client system, and provided to the rules engine as an event notification, can contain a list of users that are needed to review an electronic document. In the disclosed system, the routing of the document among the users in the review list may be determined in response to the presence-based availability of specific users in the list. For example, the disclosed system may operate by temporarily skipping users in the review list that are not currently available to process the document, and instead routing the document to one or more users in the review list that are determined to be currently available for the review. Additionally, if a user has been routed the document to be reviewed, and fails to route it within a predetermined time limit, the disclosed system may operate to forward to the document to another user for review that is determined to be currently available.

The disclosed system may be embodied to provide a user interface, for example through a GUI, through which a person that has reviewed a document, may expressly forward the document to a next person on the review list. The disclosed system may indicate a next person on the review list to forward the document to based on a determination that a user on the list that was previously skipped is now available. Alternatively, the disclosed system may provide an interface allowing the current reviewer to specify that the document is to be routed back to one of the previous reviewers, or even directly back to the original author. In addition, the disclosed system may be embodied such that, if a user on the review list is not currently available, the document may be routed to his or her specified stand-in user.

Example

Sequential Scheduling

The disclosed system may further be embodied to effectively support sequential meeting scheduling. In general, meeting scheduling systems attempt to display people's free time, allow the meeting requester to propose a time, and then send out invitations which can be either accepted or refused. Using the disclosed system, meeting invitations, such as email or other electronic data messages, may be sent out to one user at a time, in a similar manner to that described above for document routing. Accordingly, the meeting invitation is sent to users based on their current presence-based and user configured availability. The meeting invitee user list may also optionally be processed by transmitting an invitation to users on the list based on an ordering in which those users considered or designated as the most senior, and/or that are considered or designated as the most difficult to schedule, are contacted first, with each user specifying a range of available times, and wherein a list of possible meeting times contained in the invitation becomes narrower as the invitation routing proceeds. Alternatively, the meeting invitation can be simultaneously broadcast to all users on the list with the list of times becoming narrower as users respond, potentially giving people an incentive to respond quickly.

Example

External Events

In addition to processing requests for real-time actions such as meetings, and/or event notifications reflecting presence status or changes, the disclosed system may be embodied to process notifications of other types of events from various external systems. For example, such an external event processed by the disclosed system may reflect a specified change in a database, such as a customer exceeding a credit limit, or an alert generated by any external program, such as a customer relationship management system indicating that a customer entered a complaint. Availability filtering by the disclosed system may reflect the receipt of such notifications of external events.

While the disclosed system is described herein with reference to various embodiments and examples of operation in which convening a meeting is used as an example of a real-time activity or action, the real-time activities or actions provided by or in connection with the disclosed system are not limited to meetings between users, and may additionally or alternatively include chat sessions, shared whiteboards, remote presentations, audio conferences, video conferences, and/or any combination of these or other forms of communication between users. For example, any specific type of internal or external collaboration and conferencing software, having some combination of functionalities such as those provided in Microsoft® NetMeeting™, which includes point-to-point telephony and videophone capability over the Internet as well as multipoint whiteboard and application sharing, may be used to partially or completely provide the real-time activities and/or actions described herein.

Those skilled in the art should readily appreciate that the programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Therefore, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method, comprising:
receiving, by a computer based system configured to support real-time communication, a request for a real-time communication, wherein the request includes a list of users to participate in the real-time communication;
querying, by the computer based system, a presence database to obtain online presence data associated with the list of users;
determining, by the computer based system, that a user on the list of users is unavailable to participate in the real-time communication based on the online presence data associated with the unavailable user;
determining, by the computer based system, availability of an alternative user based on the online presence data associated with the alternative user in response to the unavailable user being unavailable to participate in the real-time communication;
substituting, by the computer based system, the alternative user to participate in the real-time communication for the unavailable user;
receiving, by the computer based system, a presence change message associated with the unavailable user;
processing, by the computer based system, a rule having a logical structure defining a relationship between the online presence data, the presence change message, and the real-time communication, the processing of the rule including determining whether the real-time communication should be performed based at least in part on the presence change message; and
performing, by the computer based system, the real-time communication.

2. The method of claim 1, wherein the real-time communication is a telephone call.

3. The method of claim 1, wherein the real-time communication is a chat session.

4. The method of claim 1, wherein the real-time communication is a shared whiteboard.

5. The method of claim 1, wherein the real-time communication is a remote presentation.

6. The method of claim 1, wherein the real-time communication activity is a video conference.

7. The method of claim 1, wherein the performing the real-time communication includes setting up a connection by sending an instant message.

8. The method of claim 7, wherein the sending the instant message is accomplished by introducing the instant message into a communications stream.

9. The method of claim 1, wherein in response to the determining that the user on the list of users is unavailable to participate in the real-time cornmunication, generating, by the computer based system, a script to be executed upon receipt of an other presence change message indicating that the unavailable user has become available.

10. The method of claim 1, wherein the presence change message indicates that the unavailable user is presently using a software program on a client system.

11. The method of claim 10, wherein the presence change message further indicates that the software program is an instant messaging client software.

12. The method of claim 1, further comprising determining, by the computer based system, that a second user is unavailable, and in response, determining, by the computer based system, that a stand-in user is available to take a place of the unavailable second user, and performing, by the computer based system, the real-time communication with the stand-in user in the place of the unavailable second user.

13. The method of claim 1, wherein the list of users to participate in the real time communication includes a name of a group of users, wherein the unavailable user is contained within the name of the group of users.

14. A system comprising:
  a computing device for supporting real-time communication between at least two users; and
  a computer program storage memory communicably coupled with the computing device, the computer program storage memory storing a computer program executable by the computing device, the computer program including program code configuring the computing device to:
  receive a request for the real-time communication, and in response, retrieve from the request a list of users to participate in the real-time communication;
  query a presence database to obtain online presence data associated with the list of users and to determine that a user on the list of users is unavailable to participate in the real-time communication based on the online presence data associated with the unavailable user;
  determine availability of an alternative user based on the online presence data associated with the alternative user in response to the unavailable user being unavailable to participate in the real-time communication;
  substitute the alternative user to participate in the real-time communication for the unavailable user;
  receive a presence change message associated with the alternative user and to responsively process a rule having a logical structure defining a relationship between the online presence data, the presence change message; and
  perform the real-time communication.

15. The system of claim 14, wherein the real-time communication is a telephone call.

16. The system of claim 14, wherein the real-time communication is a chat session.

17. The system of claim 14, wherein the real-time communication is a shared whiteboard.

18. The system of claim 14, wherein the real-time communication is a remote presentation.

19. The system of claim 14, wherein the real-time communication activity is a video conference.

20. The system of claim 14, wherein the performing of the real-time communication activity includes setting up a connection by sending an instant message.

21. The system of claim 14, wherein responsive to the determining that the user on the list of users is unavailable to participate in the real-time communication, the program code further configuring the computing device to generate a script to be executed upon receipt of a presence change message indicating that the unavailable user has become available.

22. The system of claim 14, wherein the presence change message indicates that the unavailable user is presently using a software program on a client system.

23. The system of claim 14, wherein the presence change message indicates that the software program is an instant messaging client software.

24. The system of claim 14, wherein the program code further configures the computing device to determine that a second user is unavailable, and in response, determine that a stand-in user is available to take a place of the unavailable second user.

* * * * *

UNITED STATES PATENT AND TRADEMARK OFFICE
CERTIFICATE OF CORRECTION

| | | |
|---|---|---|
| PATENT NO. | : 8,375,092 B2 | Page 1 of 1 |
| APPLICATION NO. | : 12/463200 | |
| DATED | : February 12, 2013 | |
| INVENTOR(S) | : Digate et al. | |

It is certified that error appears in the above-identified patent and that said Letters Patent is hereby corrected as shown below:

In the Specifications

Column 1, Lines 12-13, delete "CROSS REFERENCE TO RELATED APPLICATIONS" and insert the same at Line 7, below Title as a Heading.

Column 1, Line 16, delete "Not Applicable".

Column 3, Line 30, delete "DRAWING" and insert -- DRAWINGS --, therefor.

Column 13, Line 2, delete "systems" and insert -- systems. --, therefor.

Column 14, Line 51, delete "to based on" and insert -- based on --, therefor.

In the Claims

Column 16, Line 66, in Claim 9, delete "cornmunication," and insert -- communication, --, therefor.

Signed and Sealed this
Sixth Day of May, 2014

Michelle K. Lee
*Deputy Director of the United States Patent and Trademark Office*